United States Patent
Lee et al.

(10) Patent No.: US 9,997,901 B2
(45) Date of Patent: Jun. 12, 2018

(54) METHOD AND SWITCH FOR AUTOMATICALLY CUTTING OFF HIGH TEMPERATURE AND HIGH CURRENT BY USING METAL-INSULATOR TRANSITION (MIT) DEVICE

(71) Applicant: MOBRIK CO., LTD., Chungcheongbuk-do (KR)

(72) Inventors: Dong Che Lee, Chungcheongbuk-do (KR); Young Gu Lee, Suwon-si (KR); Chung Hyon Choi, Yongin-si (KR)

(73) Assignee: MOBRIK CO., LTD., Chungcheongbuk-do (KR)

( * ) Notice: Subject to any disclaimer, the term of this patent is extended or adjusted under 35 U.S.C. 154(b) by 151 days.

(21) Appl. No.: 14/778,952

(22) PCT Filed: May 13, 2014

(86) PCT No.: PCT/KR2014/004293
§ 371 (c)(1),
(2) Date: Sep. 21, 2015

(87) PCT Pub. No.: WO2015/088111
PCT Pub. Date: Jun. 18, 2015

(65) Prior Publication Data
US 2016/0064917 A1    Mar. 3, 2016

(30) Foreign Application Priority Data
Dec. 9, 2013 (KR) .................. 10-2013-0152184

(51) Int. Cl.
*H02H 3/08* (2006.01)
*H02H 5/04* (2006.01)
*H02H 7/18* (2006.01)

(52) U.S. Cl.
CPC ............ *H02H 3/085* (2013.01); *H02H 5/041* (2013.01); *H02H 5/047* (2013.01); *H02H 7/18* (2013.01)

(58) Field of Classification Search
CPC ......... H02H 3/085; H02H 5/041; H02H 5/047
See application file for complete search history.

(56) References Cited

U.S. PATENT DOCUMENTS

2007/0072060 A1 * 3/2007 Chang ................. H01M 10/443
429/62
2008/0246441 A1 * 10/2008 Tsubaki .................. H02H 7/18
320/150

(Continued)

FOREIGN PATENT DOCUMENTS

KR    1020060124614 A    12/2006
KR      20080045324 A *   5/2008

(Continued)

OTHER PUBLICATIONS

International Search Report for PCT/KR2014/004293 dated Aug. 22, 2014.

*Primary Examiner* — Scott Bauer
(74) *Attorney, Agent, or Firm* — Hauptman Ham, LLP

(57) ABSTRACT

A method of automatically cutting off high temperature and high current, includes calculating an FET voltage applied to an FET (Field Effect Transistor), based on a resistance of a CTS (Critical Temperature Switch) and a reference resistance, comparing the FET voltage with a predetermined threshold voltage, and setting the FET to an ON state when the FET voltage is higher than the threshold voltage and setting the FET to an OFF state when the FET voltage is lower than the threshold voltage. The CTS is a switch (Continued)

including an MIT (Metal-Insulator Transition) device. The MIT device has a metallic property only in a predetermined temperature range.

5 Claims, 12 Drawing Sheets

(56) References Cited

U.S. PATENT DOCUMENTS

| | | | |
|---|---|---|---|
| 2009/0315724 A1* | 12/2009 | Kim | G01K 3/005 340/584 |
| 2010/0033113 A1* | 2/2010 | Maruyama | H05B 33/0812 315/309 |
| 2011/0043141 A1* | 2/2011 | Kim | H01L 49/003 315/309 |

FOREIGN PATENT DOCUMENTS

| | | |
|---|---|---|
| KR | 100834691 B1 | 6/2008 |
| KR | 1020080063357 A | 7/2008 |
| KR | 1020120127060 A | 11/2012 |

* cited by examiner

METHOD AND SWITCH FOR AUTOMATICALLY CUTTING OFF HIGH TEMPERATURE AND HIGH CURRENT BY USING METAL-INSULATOR TRANSITION (MIT) DEVICE

TECHNICAL FIELD

The present invention relates to a method and a switch for automatically cutting off high temperature and high current by using a metal-insulator transition (MIT) device, and more particularly, to a method and a switch for automatically cutting off power at high temperature and high current by using an MIT device.

BACKGROUND ART

Generally, batteries that are mainly used in electronic devices including smart phones, etc. should not have problems such as damage or heating due to over-temperature. To solve this problem, a battery protection circuit is implemented to prevent the damage of the battery and etc. Such a battery protection circuit includes a first protection circuit and a second protection circuit including bi-Metal, TCO, PTC, or a fuse, to supplement the operation of the first protection circuit.

However, since the existing battery protection circuit consists of two protection circuits, not only does it result in high manufacturing cost but also it fails to comply with the trend of downsizing electronic devices.

DISCLOSURE OF INVENTION

Problem to be Solved by the Invention

The present invention is to provide a method and a switch for automatically cutting off power at high temperature and high current by applying a metal-insulator transition (MIT) device.

Means for Solving Problem

A method of automatically cutting off high temperature and high current, according to some embodiments of the present invention, includes calculating an FET voltage applied to an FET (Field Effect Transistor), based on a resistance of a CTS (Critical Temperature Switch) and a reference resistance, comparing the FET voltage with a predetermined threshold voltage, and setting the FET to an ON state when the FET voltage is higher than the threshold voltage and setting the FET to an OFF state when the FET voltage is lower than the threshold voltage. The CTS is a switch including an MIT (Metal-Insulator Transition) device. The MIT device has a metallic property only in a predetermined temperature range.

In some embodiments, the FET voltage is calculated by following Equation.

$$V_{gs} = V_{source} \times \frac{R_{CTS}}{R_{ref} + R_{CTS}} \qquad \langle \text{Equation} \rangle$$

In this Equation, $V_{gs}$ is FET voltage, $V_{source}$ is power source voltage, $R_{CTS}$ is CTS resistance, and $R_{ref}$ is reference resistance.

In some embodiments, the FET includes an N-type MOSFET, and the CTS has different transitions of resistance change between when temperature rises and when temperature drops.

A switch for automatically cutting off high temperature and high current, according to some embodiments of the present invention, includes a CTS (Critical Temperature Switch) including an MIT (Metal-Insulator Transition) device and having a metallic property only in a predetermined temperature range, a reference resistance for determining, based on a power source voltage input from a power source connected in series to a CTS resistance, a CTS voltage applied to the CTS resistance, and an FET (Field Effect Transistor) including a gate and a source respectively connected to both terminals of the CTS and configured to perform an ON/OFF operation based on the CTS voltage and a predetermined threshold voltage. Upon comparing a FET voltage between the gate and the source with the threshold voltage, the FET is set to an ON state when the FET voltage is higher than the threshold voltage, and to an OFF state when the FET voltage is lower than the threshold voltage.

In some embodiments, the FET voltage is calculated by following Equation.

$$V_{gs} = V_{source} \times \frac{R_{CTS}}{R_{ref} + R_{CTS}} \qquad \langle \text{Equation} \rangle$$

In this Equation, $V_{gs}$ is FET voltage, $V_{source}$ is power source voltage, $R_{CTS}$ is CTS resistance, and $R_{ref}$ is reference resistance.

In some embodiments, the switch is connected to an input/output terminal of a protection IC (Integrated Circuit) for protecting a battery and configured to determine whether or not to supply power based on the FET voltage.

In some embodiments, the switch is included in a signal unit for controlling an FET of a protection IC (Integrated Circuit) for protecting a battery and configured to determine whether or not to supply power based on the FET voltage.

A switch for automatically cutting off high temperature and high current, according to some embodiments of the present invention, includes a first cut-off switch and a second cut-off switch. The first cut-off switch includes a first CTS (Critical Temperature Switch) including a first MIT (Metal-Insulator Transition) device and having a metallic property only in a first predetermined temperature range, a first reference resistance for determining, based on a first power source voltage input from a first power source connected in series to a first CTS resistance, a first CTS voltage applied to the first CTS resistance, and a first FET (Field Effect Transistor) including a first gate and a first source respectively connected to both terminals of the first CTS and configured to perform an ON/OFF operation based on the first CTS voltage and a first predetermined threshold voltage. The second cut-off switch includes a second CTS including a second MIT device and having a metallic property only in a second predetermined temperature range, a second reference resistance for determining, based on a second power source voltage input from a second power source connected in series to a second CTS resistance, a second CTS voltage applied to the second CTS resistance, and a second FET including a second gate and a second source respectively connected to both terminals of the second CTS and configured to perform an ON/OFF operation based on the second CTS voltage and a second predetermined threshold voltage. The first cut-off switch is configured to compare a first FET voltage between the first gate and the first source with the first threshold voltage, and to set the first FET to an ON state when the first FET voltage is higher than the first threshold voltage, and to an OFF state when the first FET voltage is lower than the first threshold voltage. The second cut-off switch is configured to compare a second FET voltage between the second gate and the second source with the second threshold voltage, and to set the second FET to an ON state when the second FET voltage is higher than the second threshold voltage, and to an OFF state when the second FET voltage is lower than the second threshold voltage.

In some embodiments, the first CTS is configured to prevent an over-discharge, and the second CTS is configured to prevent an over-charge.

In some embodiments, the first temperature range and the second temperature range differ from each other.

In some embodiments, the first FET voltage is calculated by Equation 1.

$$V_{gs} = V_{source} \times \frac{R_{CTS}}{R_{ref} + R_{CTS}} \quad \langle \text{Equation 1} \rangle$$

In Equation 1, $V_{gs}$ is first FET voltage, $V_{source}$ is first power source voltage, $R_{CTS}$ is first CTS resistance, and $R_{ref}$ is first reference resistance.

In some embodiments, the second FET voltage is calculated by Equation 2.

$$V_{gs} = V_{source} \times \frac{R_{CTS}}{R_{ref} + R_{CTS}} \quad \langle \text{Equation 2} \rangle$$

In Equation 2, $V_{gs}$ is second FET voltage, $V_{source}$ is second power source voltage, $R_{CTS}$ is second CTS resistance, and $R_{ref}$ is second reference resistance.

Effect of the Invention

As described above, a method and a switch for automatically cutting off high temperature and high current by using a metal-insulator transition (MIT) device, according to some embodiments of the present invention, can provide a circuit protection by cutting off power supplied to a circuit when a heat is generated due to an excessive current.

Furthermore, it is possible to realize a power blocking device with small margins of errors in reaction temperature and at a lower cost compared to existing devices by using a switch that automatically cuts off high temperature and high current based on the MIT technology instead of using a conventional method of cutting off power when the circuit is heated due to an excessive current, such as bi-metal, TCO (Thermal Cut Off), PTC (Positive Temperature Coefficient), or a fuse.

BEST MODE(S) FOR CARRYING OUT THE INVENTION

Figure 1:
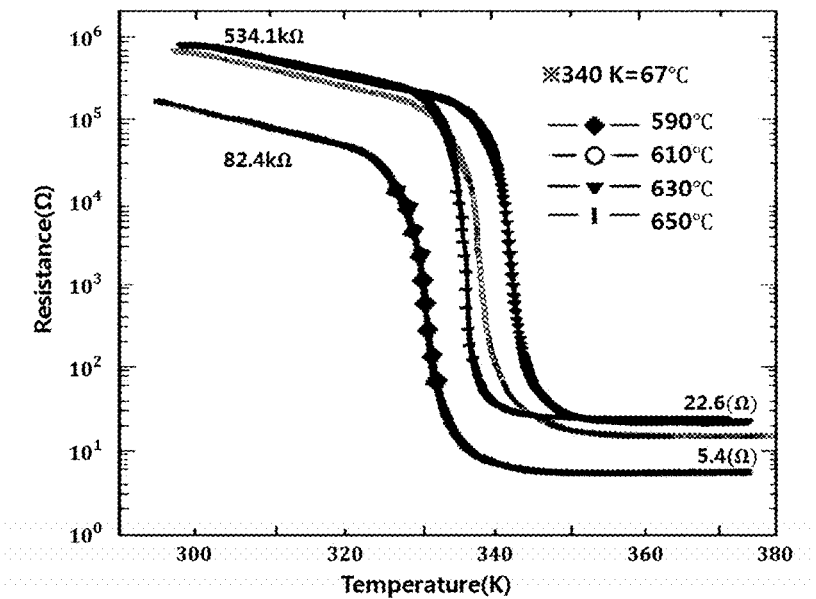
FIG. 1 is a graph illustrating the resistance change according to the temperature of the thin film of $VO_2$ (Vanadium Dioxide).

Exemplary embodiments of the present invention will be described in detail below with reference to the accompanying drawings. It will be understood that this inventive concept may, however, be embodied in many different forms and should not be construed as limited to the embodiments set forth herein. Rather, these embodiments are provided so that this disclosure will include all the modifications, equivalents, or substitutes within the scope of the ideology and technology of the present invention. In the drawings, like reference numbers refer to like elements throughout.

It will be understood that, although the terms "first", "second", etc. may be used herein to describe various elements, these elements are not to be limited by these terms. These terms are only used to distinguish one element from another element. Thus, a first element discussed below could be termed a second element without departing from the teachings of example embodiments, and vice versa. The term 'and/or' refers to the combination of a plurality of the related elements described, or any one of a plurality of the related elements.

It will be understood that when an element is referred to as being "connected" or "coupled" to another element, it can be directly connected or coupled to the other element or intervening elements may be present. On the other hand, when an element is referred to as being 'directly connected' or 'directly linked' to another element, it should be understood that no other element exists in between.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Reference will now be made in detail to embodiments, examples of which are illustrated in the accompanying drawings, wherein like reference numerals refer to like elements throughout and overlapping description for like elements are omitted.

FIG. 1 is a graph illustrating the resistance change according to the temperature of the thin film of $VO_2$ (Vanadium Dioxide).

Metal-Insulator Transition (MIT) means a phenomenon wherein a specific insulation material abruptly changes from the properties of insulation (non-conductor characteristic) to that of a metallic property at a particular temperature or in a particular electric field.

FIG. 1 illustrates the resistance rapidly declining by almost a hundred-thousandth at around 67° C. when the temperature of Vanadium Dioxide ($VO_2$), an insulator (non-conductor), is raised from room temperature. Such a rapid change of resistance according to temperature is a major characteristic of Metal-Insulator Transition (MIT).

The exemplary embodiment of the present invention discloses a switch for automatically cutting off high temperature and high current (hereinafter referred to as 'a switch for automatically cutting off high temperature and high current') by applying an MIT technique that automatically blocks a circuit when the level of temperature or current exceeds a particular limit, by using an MIT technique, wherein a non-conductor rapidly turns into a metallic property at a particular temperature, and a FET (Field Effect Transistor) which is mainly used as a switch for the electric circuit.

A switch for automatically cutting off high temperature and high current according to the present invention may be implemented based on a switch applied with an MIT technique (for example, CTS (Critical Temperature Switch)), a reference resistance (Rref) used for setting a reference point to determine the on/off status of the switch, and a FET. The on/off status of FET can be determined according to the voltage supplied by the CTS and the reference resistance (Rref).

Figure 2:
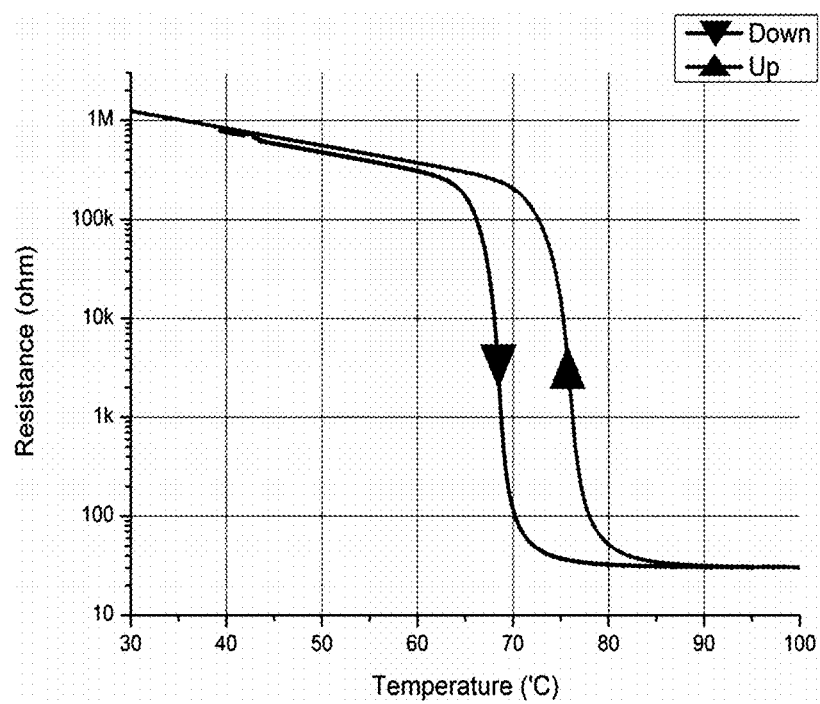
FIG. 2 is a graph illustrating the temperature/resistance dependence of the CTS based on MIT.

FIG. 2 is a graph showing temperature/resistance dependence of the CTS applied with an MIT technique.

Referring to FIG. 2, the resistance of CTS may vary by temperature. The CTS having 1 MΩ of resistance at 30° C. may gradually decline as the temperature increases in the temperature zone of 30° C. to 70° C., and then rapidly decline to about below 100Ω in the zone of 70° C. to 80° C. That is, the resistance gradually declining as temperature increases shows a rapid decline at a particular temperature (60° C. to 90° C., depending on the deposition condition) at the rate of $10^{-4}$. In addition, the CTS displays hysteresis behavior; there is a gap between the trend of resistance change when temperature rises and the trend when temperature drops.

The characteristic of CTS resistance change by temperature may vary according to the MIT device applied to a CTS. The automatic high temperature and high current cut-off switch, consisting of a CTS of such characteristic, a reference resistance, and a FET, can automatically block the circuit when the level of temperature or current passes a particular limit. The exemplary embodiment of the present invention hereby discloses various configuration of such switch that automatically blocks high temperature and high current.

Figure 3:
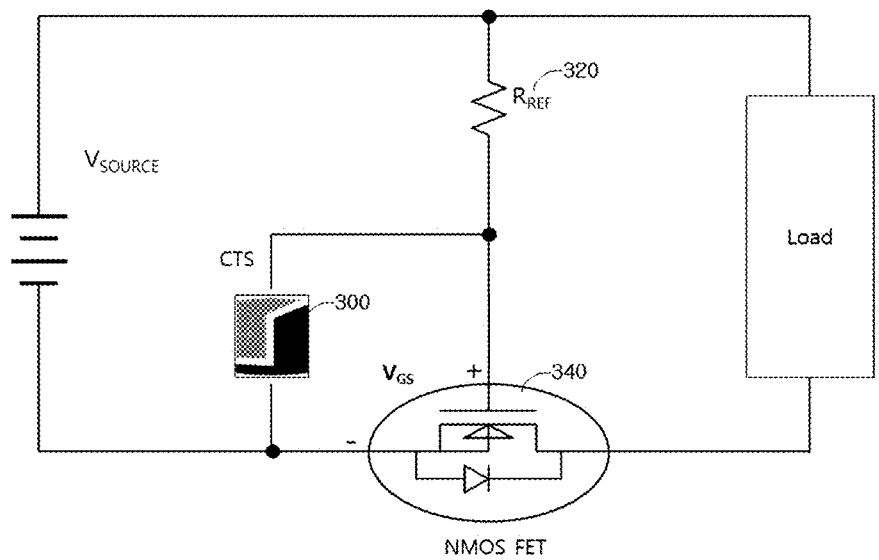
FIG. 3 is a conceptual diagram illustrating a switch for automatically cutting off high temperature and high current according to the exemplary embodiment of the present invention.

FIG. 3 is a conceptual diagram illustrating a switch for automatically cutting off high temperature and high current according to the exemplary embodiment of the present invention.

Referring to FIG. 3, a switch for automatically cutting off high temperature and high current may include a CTS 300, a reference resistance 320, and an FET 340.

That is, a switch for automatically cutting off high temperature and high current may include the CTS 300 applied based on an MIT device, of which the device has a metallic property only in a specific temperature range; the reference resistance 320 used for determining a CTS voltage applied to the CTS resistance on the basis of a source voltage input by connecting in series to the resistance of the CTS 300; and the FET (Field Effect Transistor) 340, wherein both terminals of the CTS 300 are connected to a gate and a source, respectively, operating on/off motions by comparing a CTS voltage with a threshold voltage. A switch for automatically cutting off high temperature and high current compares the amplitude of the FET voltage, which is a voltage between the gate and the source, with the amplitude of a threshold voltage, and determines that the FET 340 is in a turn-on state when the FET voltage is higher than the threshold voltage, and that the FET 340 is in a turn-off state when the FET voltage is lower than the threshold voltage.

An N-channel metallic oxide semiconductor field effect transistor (MOSFET) (hereinafter referred to as "N-channel MOSFET") 340, applied to realize a switch for automatically cutting off high temperature and high current is determined to become a turn-on/off state based on the voltage between a gate and a source ($V_{gs}$) and a threshold voltage ($V_{TM}$) for example, 0.6 V to 1.5 V). For example, when the applied $V_{gs}$ is higher than the threshold voltage, the N-type MOSFET is turned 'ON' and a closed circuit can be formed between a voltage source ($V_{source}$) and a load. On the contrary, when the applied $V_{gs}$ is lower than the threshold voltage, the N-type MOSFET is turned 'OFF', and the voltage source becomes separated from the load.

As shown in FIG. 3, when the CTS 300 having different resistance by temperature is employed, and a fixed resistance is applied to the reference resistance 320, the applied voltage ($V_{gs}$) between a gate and a source of the N-type MOSFET 340 can have a value calculated by Equation 1.

$$V_{gs} = V_{source} \times \frac{R_{CTS}}{R_{ref} + R_{CTS}} \qquad \langle \text{Equation 1} \rangle$$

$V_{gs}$: voltage applied between gate and source of N-type MOSFET
$V_{source}$: power source voltage
$R_{CTS}$: resistance
$R_{ref}$: reference resistance According to the exemplary embodiment of the present invention, the on/off state of the N-type MOSFET 340 is determined according to the $R_{CTS}$ that varies by temperature. That is, assuming that $V_{source}$=5 V, $R_{ref}$=100 kΩ is employed, most of the $V_{source}$ is applied to both terminals of the $R_{CTS}$ because, as shown by FIG. 2, the $R_{CTS}$ is much greater than the $R_{ref}$ at room temperature or at a specific temperature (for example, 72° C.) and below. As a result, the $V_{gs}$ becomes greater than the $V_{TM}$, and the N-type MOSFET 340 maintains an 'ON' status.

Meanwhile, in a high-temperature environment higher than a particular temperature, the resistance of the CTS 300 becomes 100Ω or lower by a rapid transition. As a result, the $V_{gs}$ becomes lower than the $V_{TM}$, causing the N-type MOSFET 340 to be turned 'OFF'.

Equation 2 is briefly describing the above.
<Equation 2>
At room temperature, $R_{CTS} \geq 1$ MΩ

$$V_{gs} = V_{source} \times \frac{R_{CTS}}{R_{ref} + R_{CTS}} > V_{TH} \Rightarrow N\ MOSFET\ 'on'$$

At high temperature, $R_{CTS} < 100Ω$ $$V_{gs} = V_{source} \times \frac{R_{CTS}}{R_{ref} + R_{CTS}} < V_{TH} \Rightarrow N\ MOSFET\ 'off'$$

As a result, a switch for automatically cutting off high temperature and high current wherein the N-type MOSFET 340 automatically operates in ON/OFF status according to temperature as the N-type MOSFET 340 becomes a turn-on state in case the temperature of a circuit is below a particular temperature based on a particular temperature at which the CTS 300 resistance rapidly changes, and the FET 340 becomes a turn-off state when the circuit temperature is higher than a particular temperature.

In other words, a positive temperature coefficient (PTC) is realized by using the $VO_2$ that has a negative temperature coefficient (NTC) characteristic and the FET. Both NTC and PTC thermistors have characteristics where the resistance declines as temperature rises, and increases as temperature drops. That is, the conventional MIT device having an NTC characteristic is employed to a switch for automatically cutting off high temperature and high current to block high temperature and high current with a PTC characteristic.

Additionally, referring to FIG. 2 as previously described, due to the hysteresis characteristic of CTS 300, there is a gap between the trend of the resistance change when temperature rises and the trend when temperature drops. Therefore, even if the temperature repeatedly increases and/or decreases within a certain range of temperature, the on/off operation of the N-type MOSFET 340 can prevent a rapid change of temperature according to the temperature increase and decrease.

Figure 4:
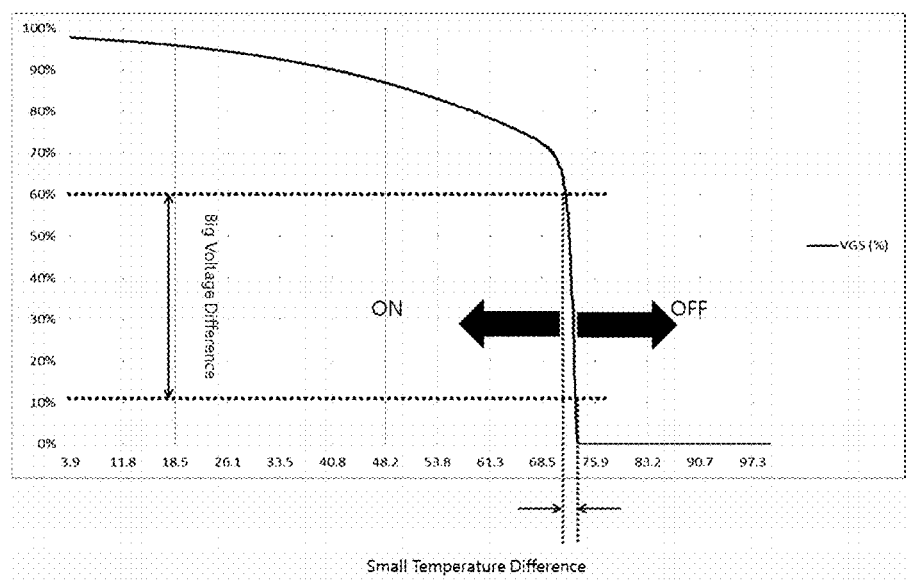
FIG. 4 is a graph illustrating the characteristic of $V_{GS}$ voltage change according to the exemplary embodiment of the present invention.

FIG. 4 is a graph showing the characteristic of $V_{GS}$ voltage changes according to the exemplary embodiment of the present invention.

The problem of N-type MOSFET is that basically it has a tolerance for error for $V_{TM}$ (of, for example, 0.5 V to 1.5 V). However, since the $V_{GS}$ voltage rapidly changes at a particular temperature (for example, 70° C. to 72° C.), as shown in FIG. 4, and the impact of $V_{TM}$'s tolerance for error to the operating temperature is minimal, it is possible to form a switch that blocks the circuit with a minimum margin of error.

Such switch for automatically cutting off high temperature and high current is applied to various circuits to block the power supplied thereto.

The following exemplary embodiment of the present invention discloses a circuit employed with a switch for automatically cutting off high temperature and high current as previously described in FIGS. 1 to 4.

Figure 5:
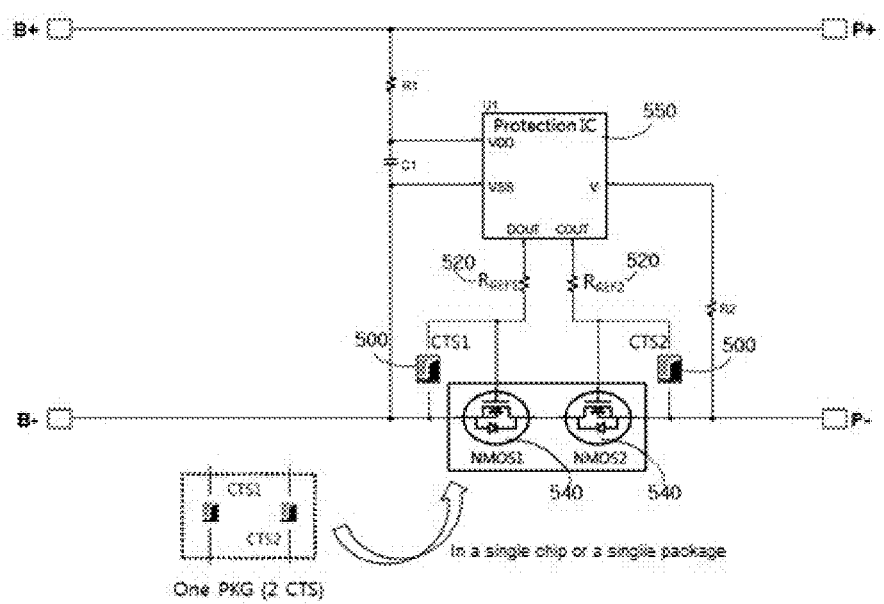
FIG. 5 is a conceptual diagram illustrating the battery protection circuit according to the exemplary embodiment of the present invention.

FIG. 5 is a conceptual diagram illustrating a battery protection circuit according to the exemplary embodiment of the present invention.

The conventional battery protection circuit provides battery protection at the rise of temperature or current by using bi-Metal, TCO, PTC, or a fuse. Referring to FIG. 5, a circuit containing a switch for automatically cutting off high temperature and high current can be formed to protect a battery by installing a switch for automatically cutting off high temperature and high current that is comprised of a CTS 500, a reference resistance 520, and an N-type MOSFET 540, according to the exemplary embodiment of the present invention.

In the event that a switch for automatically cutting off high temperature and high current according to the present invention is applied, the reaction temperature may have a margin of error within 3% while the conventional Bi-Metal has a margin of error of 10% and above. Moreover bi-metal requires the use of a PTC (Positive Temperature Coefficient) device in order to secure a hysteresis characteristic to allow the continuous operation of circuit according to the temperature change in a particular range. However, a switch for automatically cutting off high temperature and high current, according to the exemplary embodiment of the present invention, does not require a separate PTC device as the CTS 500 already has a hysteresis characteristic itself.

In addition, a switch for automatically cutting off high temperature and high current can be realized with the CTS 500, the reference resistance 520, and the N-type MOSFET 540 on each of the 'Dout' and 'Cout' terminals of a protection circuit 550. That is, a switch for automatically cutting off high temperature and high current is installed on the signal part controlling the FET of the protection IC (Integrated Circuit) to protect the battery, and determines whether or not to supply power depending on the FET voltage. When the protection circuit 550 is at high temperature, such switch for automatically cutting off high temperature and high current can break power supply through the protection circuit 550 by turning off the N-type MOSFET 540, as previously described. As a consequence, the size of such circuit containing a switch for automatically cutting off high temperature and high current can be reduced into a single chip or a single package while automatically cutting off high temperature and high current.

Figure 6:
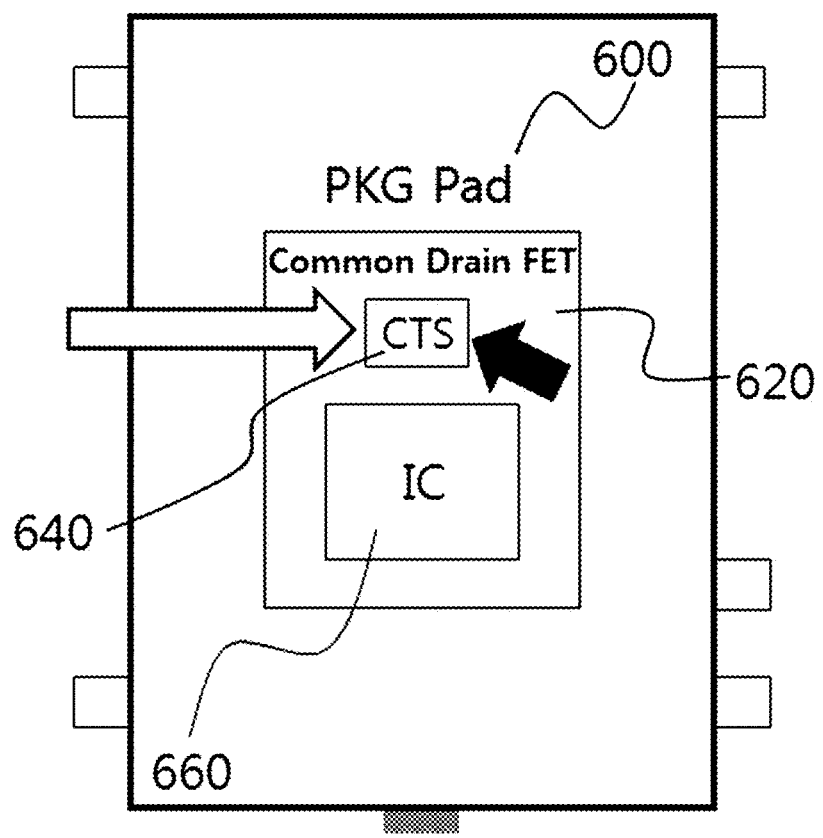
FIG. 6 is a conceptual diagram illustrating a switch for automatically cutting off high temperature and high current in a package.

FIG. 6 is a conceptual diagram illustrating a switch for automatically cutting off high temperature and high current in a package according to the exemplary embodiment of the present invention.

As shown in FIG. 6, a CTS 640 can detect the characteristic of heating generated from power supply through an FET 620; over-current can be prevented by detection of the characteristic of heating according to the level of current of the FET 620, and the motion at over-heated temperature can be also prevented by detection of the outside heat. A switch for automatically cutting off high temperature and high current in one package can be formed as the CTS 640 and a protection IC 660 are accumulated on the common drain FET 620 which is accumulated on a package pad 600. As the heat is proportional to square of current, by using such automatic high temperature and high current cut-off switch in a package, it is possible to accurately detect the heat due to over current and to break the power supply through the circuit.

Figure 7:
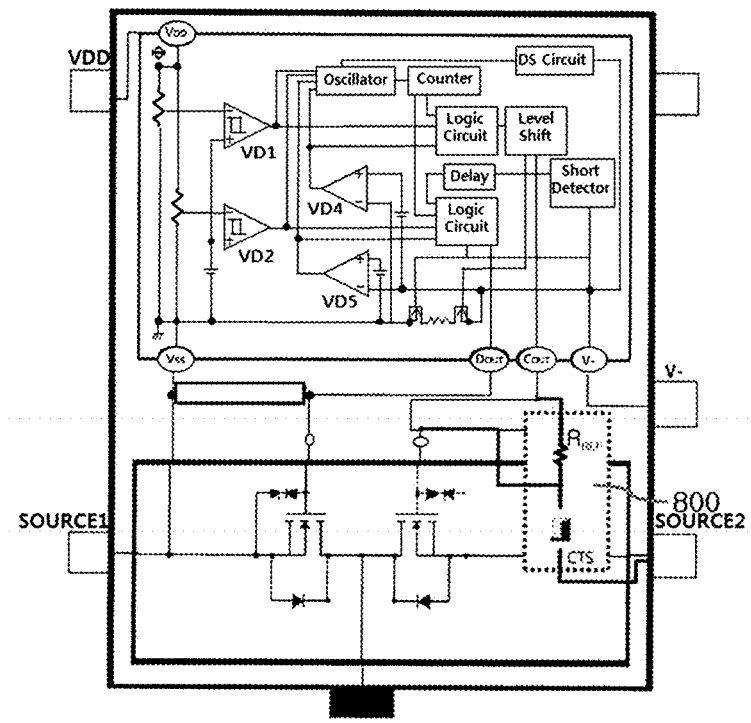
FIGS. 7 and 8 are conceptual diagrams illustrating the POC (Protection One Chip) employed with a switch for automatically cutting off high temperature and high current according to the exemplary embodiment of the present invention.
Figure 8:
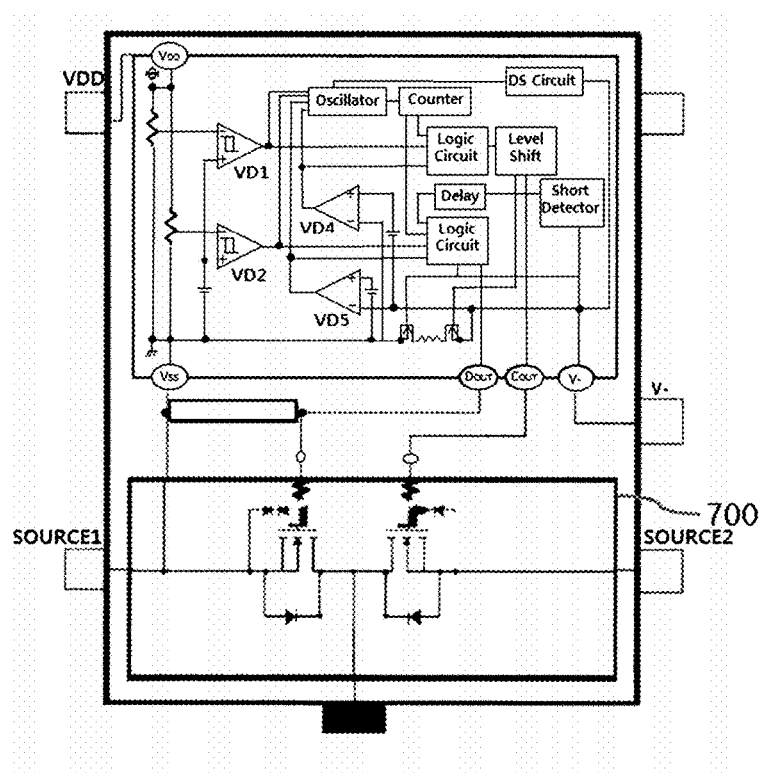

FIGS. 7 and 8 are conceptual diagrams illustrating a POC (Protection One Chip) containing a switch for automatically cutting off high temperature and high current according to the exemplary embodiment of the present invention.

FIGS. 7 and 8 show a switch for automatically cutting off high temperature and high current connected to the protection circuit.

Referring to FIG. 7, the FET, the CTS, and the reference resistance are formed in a chip 800, thereby connected to the Dout and Cout terminals of the protection circuit. That is, a switch for automatically cutting off high temperature and high current is applied on the signal part controlling the FET of the protection IC (Integrated Circuit) which protects the battery, and determines whether or not to supply power depending on the FET voltage. The switch for automatically cutting off high temperature and high current, which is connected to the protection circuit, can prevent the circuit from becoming heated at a particular temperature and above by blocking the power input to the Dout and the Cout terminals.

As shown in FIG. 8, the CTS and the reference resistance, formed in a chip 700, can be installed in an input terminal connected to Dout terminal and Cout terminal of the protection circuit. In other words, a switch for automatically cutting off high temperature and high current, connected to the input/output terminal of the protection IC (Integrated Circuit) which protects the battery, can determine whether or not to supply power depending on the FET voltage. By using such method, when heating is detected at a particular temperature and above, the power input to the Dout and the Cout terminals is blocked, thus preventing the circuit from becoming heated at a certain level of temperature or above.

Figure 9:
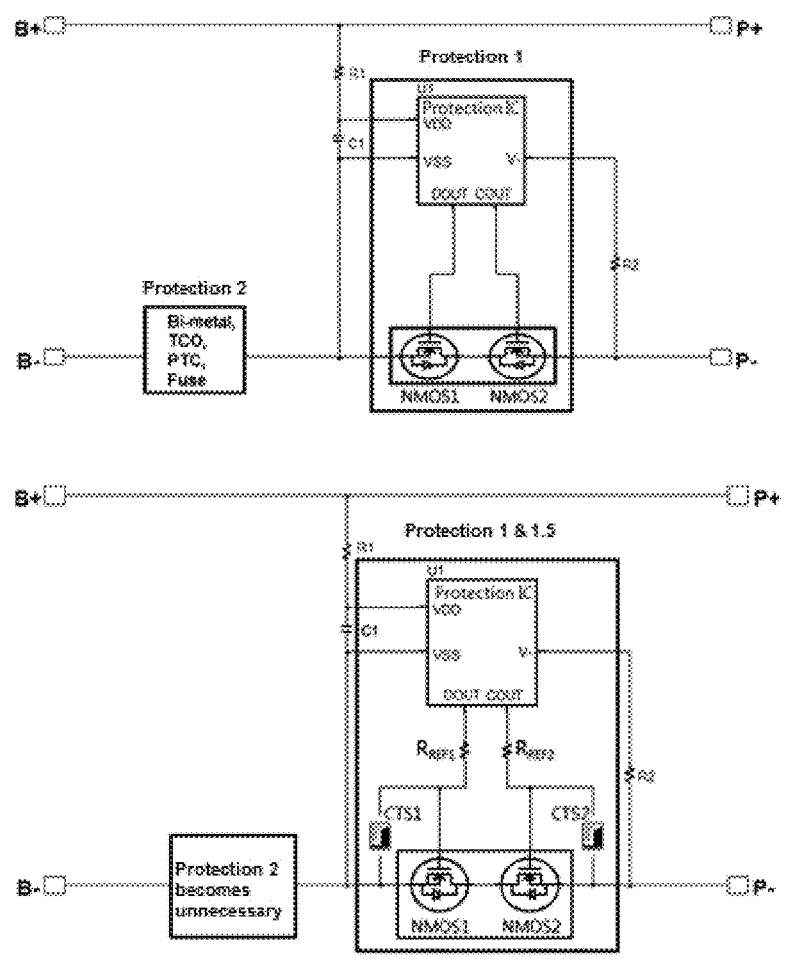
FIG. 9 is a conceptual diagram illustrating a battery protection circuit according to the exemplary embodiment of the present invention.

FIG. 9 is a conceptual diagram illustrating the battery protection circuit according to the exemplary embodiment of the present invention.

As shown in the upper part of FIG. 9, bi-Metal, TCO, PTC, or a fuse are used as the element of Protection 2 for the conventional battery protection circuit in order to supplement the circuit of Protection 1, consisting of the protection IC and two FETs. Meanwhile, as shown in the lower part of FIG. 9, when a switch for automatically cutting off high temperature and high current cut-off switch is used, the Protection 2 device becomes unnecessary, and so it is possible to reduce the cost. Also, a voltage drop due to a resistance of Protection 2 device (a few mΩ to a few tens of mΩ) can be prevented, thereby enhancing the battery efficiency.

Figure 10:
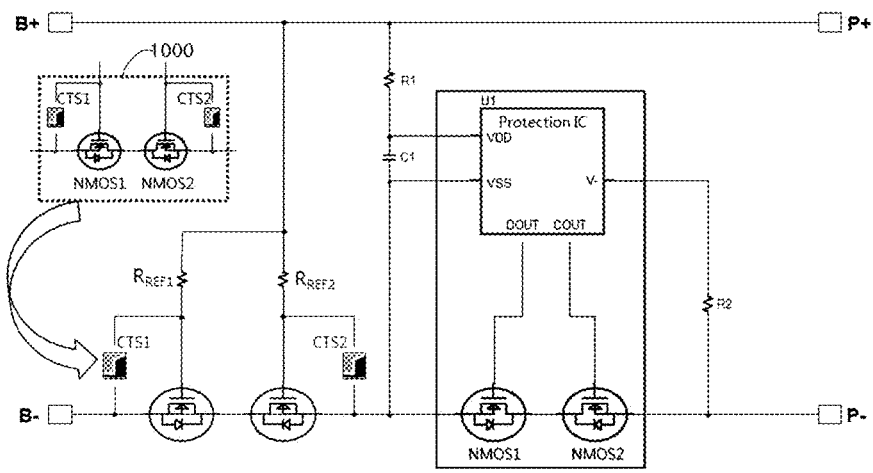
FIG. 10 is a conceptual diagram illustrating a battery protection circuit according to the exemplary embodiment of the present invention.

FIG. 10 is a conceptual diagram illustrating the battery protection circuit according to the exemplary embodiment of the present invention.

FIG. 10 is a conceptual diagram illustrating the method for blocking the circuit when the temperature or the current increases by installing a switch 1000 for automatically cutting off high temperature and high current at the front end of the protection circuit in case the circuit protecting the battery, according to the exemplary embodiment of the present invention, consists of the protection circuit and the dual N-type MOSFET which are formed in a chip.

By installing a switch for automatically cutting off high temperature and high current comprised of an N-type MOSFET, a CTS, and a reference resistance at the front end of the battery protection circuit that is realized in a single chip, it is possible to realize a circuit containing a switch for automatically cutting off high temperature and high current without using an expensive circuit configuration such as Bi-Metal.

FIGS. 5 to 10 illustrate the case wherein the switch 1000 for automatically cutting off high temperature and high current is used as a battery protection circuit. A switch for automatically cutting off high temperature and high current as indicated in FIG. 2 can be used not only in a battery protection circuit but also in various different circuits.

Figure 11:
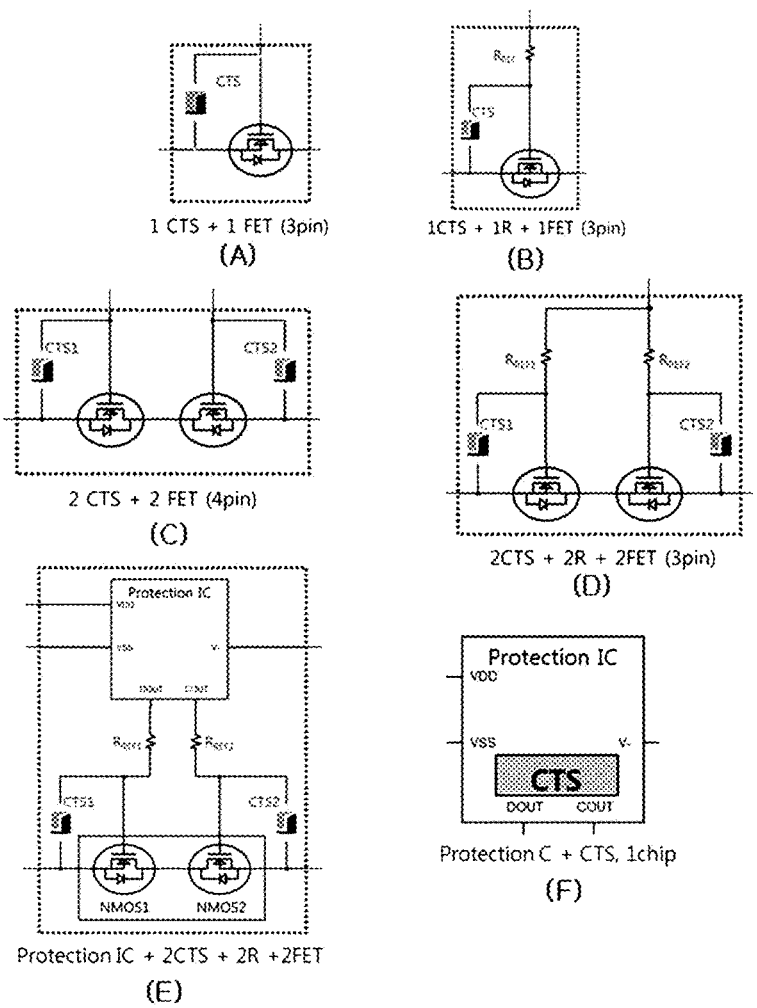
FIG. 11 is a conceptual diagram illustrating a circuit containing a switch for automatically cutting off high temperature and high current according to the exemplary embodiment of the present invention.

FIG. 11 is a conceptual diagram illustrating a circuit containing a switch for automatically cutting off high temperature and high current according to the exemplary embodiment of the present invention.

Various circuits containing switches for automatically cutting off high temperature and high current as shown in FIG. 11 can be formed with different combinations of the CTS, the FET, and the reference resistance.

FIG. 11 (A) shows a circuit containing a switch for automatically cutting off high temperature and high current consisting of one CTS and one FET. FIG. 11 (B) shows a circuit containing a switch for automatically cutting off high temperature and high current consisting of one FET and one reference resistance. Such circuit can be realized in case there is one input port to block the power input to the circuit.

FIG. 11 (C) shows a circuit containing a switch for automatically cutting off high temperature and high current consisting of two CTS's and two FETs. FIG. 11 (D) shows a circuit containing a switch for automatically cutting off high temperature and high current consisting of two CTS's, two FETs, and two reference resistances.

FIG. 11 (E) is a conceptual diagram illustrating the method for blocking power when a switch for automatically cutting off high temperature and high current is installed at the input portion of the protection circuit, and is operated at a high temperature through the protection circuit.

FIG. 11 (F) shows a circuit containing a switch for automatically cutting off high temperature and high current wherein a CTS is additionally integrated to form a protection circuit.

As shown in FIG. 11, a circuit containing a switch for automatically cutting off high temperature and high current blocks the power supplied to the circuit through various methods and can be formed for the circuit to stop operation at a particular or higher temperature or a particular or higher current.

Figure 12:
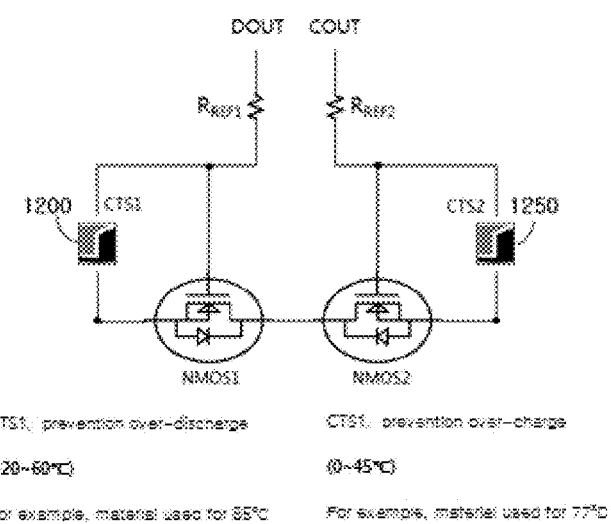
FIG. 12 is a conceptual diagram illustrating a circuit containing a switch for automatically cutting off high temperature and high current according to the exemplary embodiment of the present invention.

FIG. 12 is a conceptual diagram illustrating a circuit containing a switch for automatically cutting off high temperature and high current according to the exemplary embodiment of the present invention.

As shown in FIG. 12, two CTSs of different characteristics can be used to form a circuit containing a switch for automatically cutting off high temperature and high current in order to prevent over-discharge and over-charge.

For example, a first CTS 1200 uses the CTS wherein the resistance rapidly changes at 85° C. in order to prevent over-discharge, and a second CTS 1250 uses the CTS wherein the resistance rapidly changes at 77° C. in order to prevent over-charge. That is, by using different CTS materials it is possible to realize switches to block power at different points of temperature or current as necessary.

In addition, as shown in FIG. 12, it is possible to realize switches to block power at different points of temperature or current as necessary by using different materials applied to the CTS.

That is, a switch for automatically cutting off high temperature and high current may include a first cut-off switch and a second cut-off switch.

The first cut-off switch may include a first CTS, based on a first MIT device, operating with the properties of metal only at a first temperature range; a first reference resistance used for determining a CTS voltage applied to the CTS resistance based on the applied source voltage connected in series to the resistance of the first CTS; and a first FET (Field Effect Transistor), wherein the both terminals of the first CTS connected to a first gate and a first source, respectively, operating on/off motions by comparing the CTS voltage with a threshold voltage.

The second cut-off switch may include a second CTS, based on a second MIT device, operating with the properties of metal only at a second temperature range; a second reference resistance used for determining a CTS voltage applied to a second CTS resistance based on the applied source voltage connected in series to the resistance of the second CTS; and a second FET (Field Effect Transistor), wherein the both terminals of the second CTS connected to a second gate and a second source, respectively, operating on/off motions by comparing the second CTS voltage with a threshold voltage.

The first cut-off switch, by comparing the level of the first FET voltage existing between the first gate and the first source, with that of the first threshold voltage, turns on the first FET when the first FET voltage is higher than the first threshold voltage, and turns it off when vice versa.

Likewise, the second cut-off switch, by comparing the level of the second FET voltage existing between the second gate and the second source, with that of the second threshold voltage, turns on the second FET when the second FET voltage is higher than the second threshold voltage, and turns it off when vice versa.

When a $VO_2$ material is used for the CTS, it is possible to operate at 68° C. and below. However, the temperature range for the MIT device made of the material other than the $VO_2$ can be extended to −193° C. to −110° C. and 20° C. to 150° C. Therefore, a switch for automatically cutting off high temperature and high current can be set with different ranges of temperature control as needed when it is used where a particular temperature measurement and control is required.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A switch for automatically cutting off high temperature and high current, the switch comprising:
   a first cut-off switch; and
   a second cut-off switch,
   wherein
   the first cut-off switch includes
      a first CTS (Critical Temperature Switch) including a first MIT (Metal-Insulator Transition) device and having a metallic property only in a first predetermined temperature range,
      a first reference resistance for determining, based on a first power source voltage input from a first power source connected in series to a first CTS resistance, a first CTS voltage applied to the first CTS resistance, and
      a first FET (Field Effect Transistor) including a first gate and a first source respectively connected to both terminals of the first CTS and configured to perform an ON/OFF operation based on the first CTS voltage and a first predetermined threshold voltage, and
   the second cut-off switch includes
      a second CTS including a second MIT device and having a metallic property only in a second predetermined temperature range,
      a second reference resistance for determining, based on a second power source voltage input from a second power source connected in series to a second CTS resistance, a second CTS voltage applied to the second CTS resistance, and
      a second FET including a second gate and a second source respectively connected to both terminals of the second CTS and configured to perform an ON/OFF operation based on the second CTS voltage and a second predetermined threshold voltage,
   the first cut-off switch is configured to compare a first FET voltage between the first gate and the first source with the first threshold voltage, and to set the first FET to an ON state when the first FET voltage is higher than the first threshold voltage, and to an OFF state when the first FET voltage is lower than the first threshold voltage, and
   the second cut-off switch is configured to compare a second FET voltage between the second gate and the second source with the second threshold voltage, and to set the second FET to an ON state when the second FET voltage is higher than the second threshold voltage, and to an OFF state when the second FET voltage is lower than the second threshold voltage.

2. The switch according to claim 1, wherein the first CTS is configured to prevent an over-discharge, and the second CTS is configured to prevent an over-charge.

3. The switch according to claim 2, wherein the first temperature range and the second temperature range differ from each other.

4. The switch according to claim 3, wherein the first FET voltage is calculated $$V_{gs} = V_{source} \times \frac{R_{CTS}}{R_{ref} + R_{CTS}}, \quad \langle\text{Equation 1}\rangle$$

where $V_{gs}$ is first FET voltage, $V_{source}$ is first power source voltage, $R_{CTS}$ is first CTS resistance, and $R_{ref}$ is first reference resistance.

5. The switch according to claim 4, wherein the second FET voltage is calculated by $$V_{gs} = V_{source} \times \frac{R_{CTS}}{R_{ref} + R_{CTS}}, \quad \langle\text{Equation 2}\rangle$$

where $V_{gs}$ is second FET voltage, $V_{source}$ is second power source voltage, $R_{CTS}$ is second CTS resistance, and $R_{ref}$ is second reference resistance.

* * * * *